(12) United States Patent
Stevens et al.

(10) Patent No.: US 9,332,586 B1
(45) Date of Patent: May 3, 2016

(54) SLOT-BY-SLOT PREAMBLE ACQUISITION CONTROL TO INCREASE NETWORK CAPACITY IN MOBILE AD HOC NETWORKS

(71) Applicant: Rockwell Collins, Inc., Cedar Rapids, IA (US)

(72) Inventors: James A. Stevens, Lucas, TX (US); Charles D. Young, Tucson, AZ (US); Syed A. Ahmed, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 184 days.

(21) Appl. No.: 13/755,147

(22) Filed: Jan. 31, 2013

(51) Int. Cl.
*H04W 16/14* (2009.01)
*H04W 84/18* (2009.01)

(52) U.S. Cl.
CPC ............... *H04W 84/18* (2013.01); *H04W 16/14* (2013.01)

(58) Field of Classification Search
CPC ..................................................... H04W 16/14
See application file for complete search history.

(56) References Cited

U.S. PATENT DOCUMENTS

| | | | |
|---|---|---|---|
| 7,382,799 B1 | 6/2008 | Young et al. | |
| 7,397,810 B1 | 7/2008 | Young et al. | |
| 8,199,677 B1 | 6/2012 | Amis et al. | |
| 2005/0094558 A1* | 5/2005 | Lu | 370/229 |
| 2006/0146966 A1* | 7/2006 | Golanbari et al. | 375/343 |
| 2008/0013497 A1* | 1/2008 | Belcea | 370/337 |
| 2009/0005043 A1* | 1/2009 | Claussen et al. | 455/436 |
| 2009/0233549 A1* | 9/2009 | Maltsev et al. | 455/41.2 |
| 2010/0103924 A1* | 4/2010 | Rao et al. | 370/351 |
| 2012/0014288 A1* | 1/2012 | Dore et al. | 370/255 |
| 2012/0083201 A1* | 4/2012 | Truong et al. | 455/9 |
| 2013/0035133 A1* | 2/2013 | Hamdi et al. | 455/522 |
| 2013/0114500 A1* | 5/2013 | Liu et al. | 370/315 |
| 2013/0121157 A1* | 5/2013 | Logvinov et al. | 370/238 |

OTHER PUBLICATIONS

Young, David C., et al., "Adaptive Preamble Acquisition Control (APCA) to Increase Spatial Reuse and Netowrk Capacity in MANET Networks", 5 pages.

* cited by examiner

*Primary Examiner* — John Blanton
(74) *Attorney, Agent, or Firm* — Angel N. Gerdzhikov; Donna P. Suchy; Daniel M. Barbieri

(57) ABSTRACT

A method and system is disclosed for a local approach within a distributed multi-hop radio environment that switches between a stronger and weaker preamble acquisition. The robustness of the preamble acquisition plays a large part in the performance of a given Signal-in-Space (SiS) modulation scheme. A more robust preamble acquisition can result in a higher packet completion rate at a receiver free of interfering signals. A less robust preamble acquisition can result in less chance that an interfering signal will be acquired, thereby allowing increased spatial reuse and network throughput. To maximize network capacity, the disclosed method leverages both cases by dynamically switching between the less and more robust preamble acquisitions depending on the topology of the distributed multi-hop radio environment and desired quality of service.

40 Claims, 11 Drawing Sheets

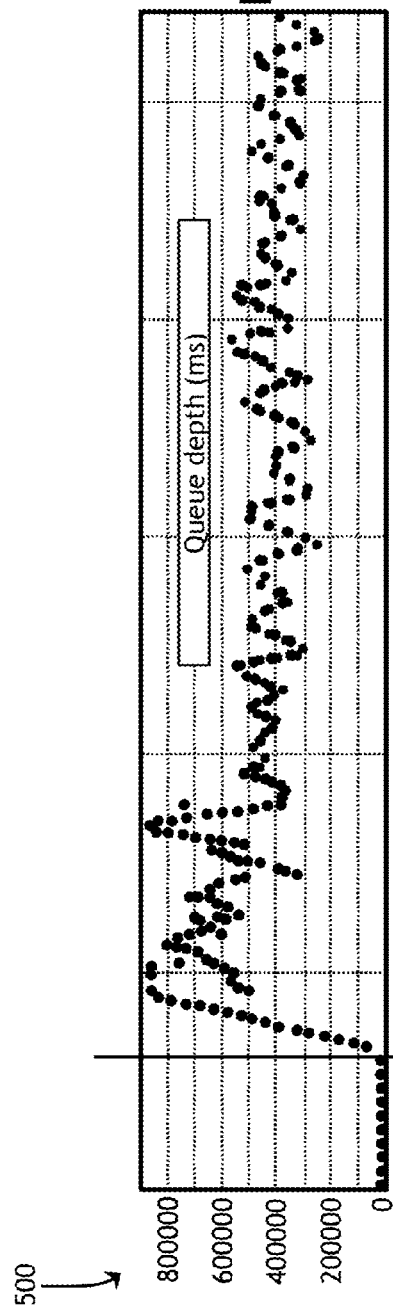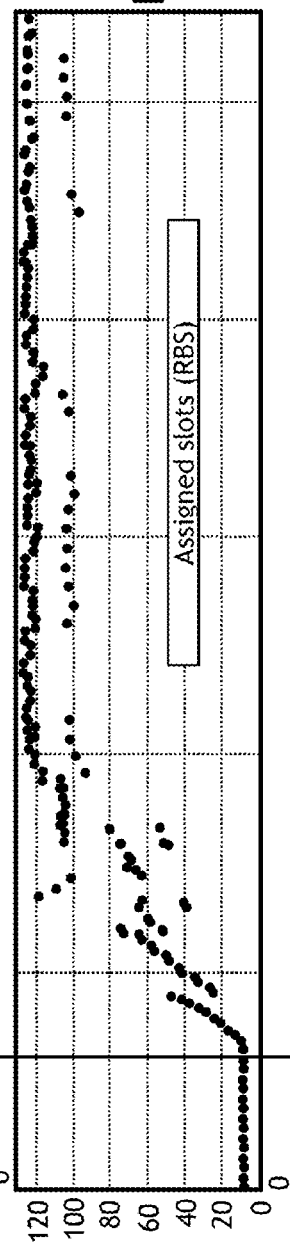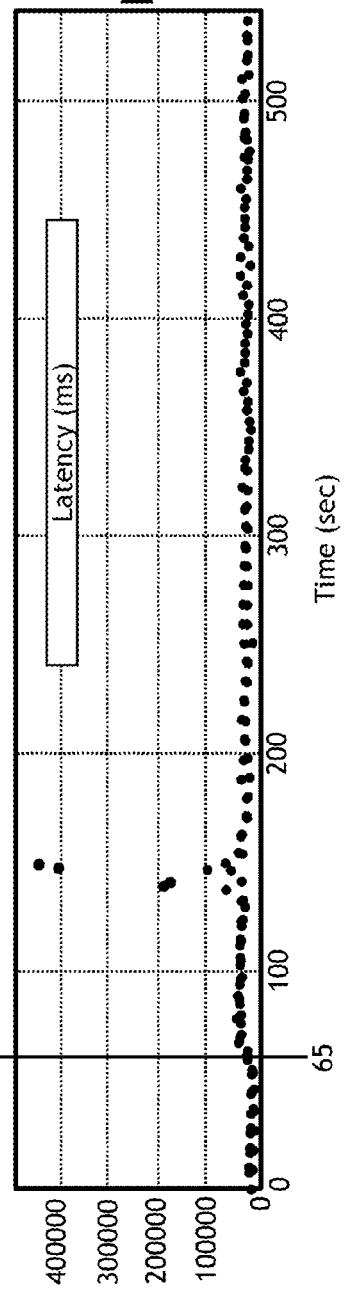

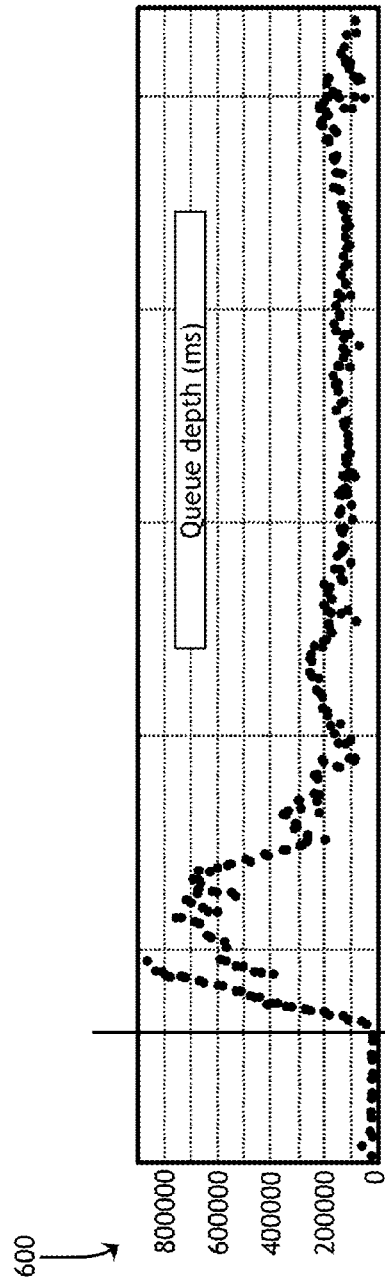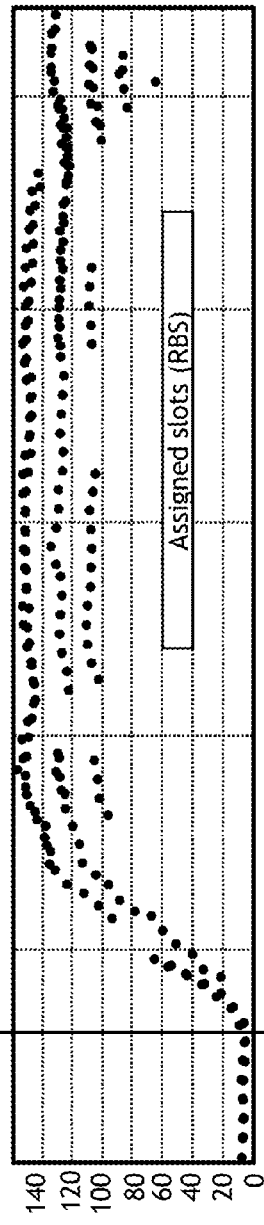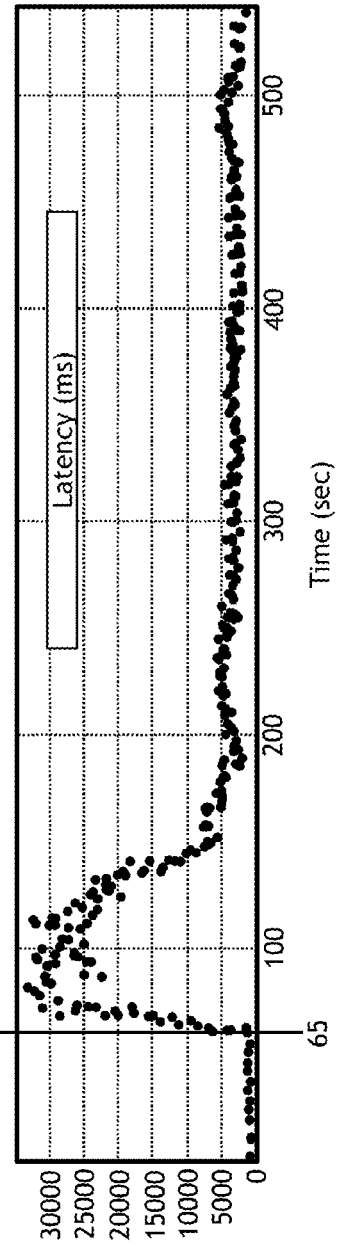

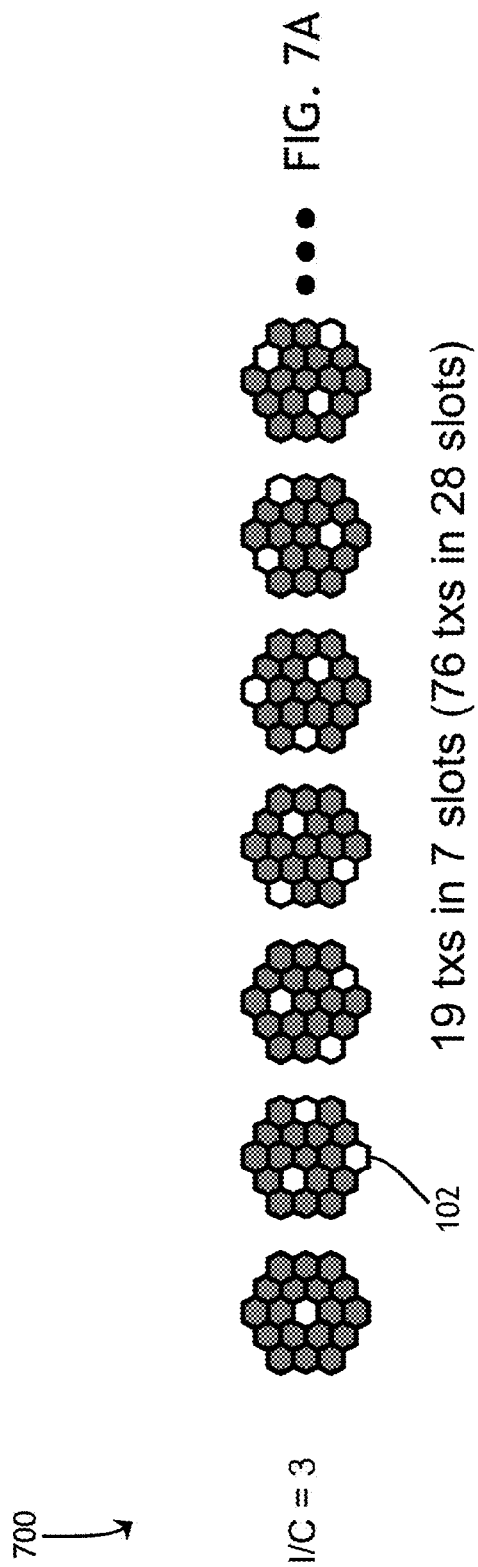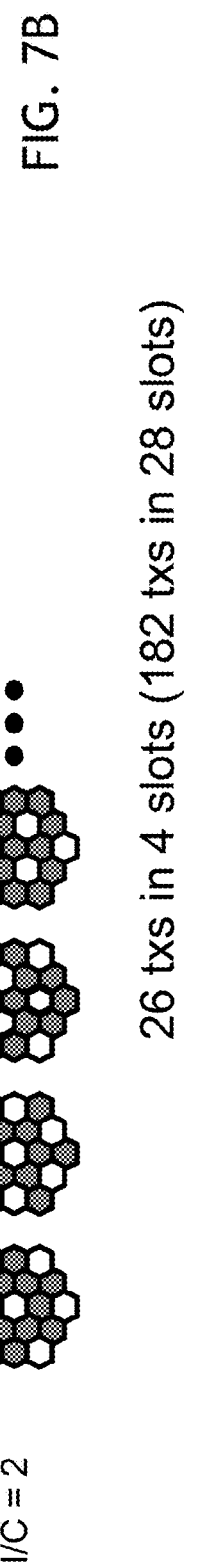
FIG. 7A — 19 txs in 7 slots (76 txs in 28 slots), I/C = 3
FIG. 7B — 26 txs in 4 slots (182 txs in 28 slots), I/C = 2

SLOT-BY-SLOT PREAMBLE ACQUISITION CONTROL TO INCREASE NETWORK CAPACITY IN MOBILE AD HOC NETWORKS

FIELD OF THE INVENTION

The present invention relates generally to mobile ad hoc radio networking. More particularly, embodiments of the present invention relate to a system and method for efficient and adaptive acquisition of a message preamble in a mobile ad hoc network of radios.

BACKGROUND OF THE INVENTION

Spatial reuse is a factor in reliable communication between multiple radios attempting to operate on a limited spectrum. Each transmitter's waveform maintains a specific transmission range on a specific frequency. This transmission range may interfere with other devices attempting to transmit and receive on or near the same frequency. Waveform interference-to-communication range ratio (I/C) has a direct effect on the ability of a network to reuse spatial resources (spatial reuse). With uncontrolled network slot allocations, spatial reuse is nonexistent.

Most wirelessly networked systems are designed with an I/C to permit reuse after two routing hops, where a hop is defined as the maximum range a transmission can be correctly received in the absence of self-interference. Beyond two hops, since the received signal power is lower than the sensitivity of the receiver, no interference is present. In contrast, when the I/C is greater than two, self-interference beyond two hops can prevent the acquisition of intended packets or cause the receiver to attempt to demodulate unintended packets. In order to maintain an acceptable packet error rate the spatial reuse must be decreased even though this also reduces throughput.

For I/C>two (certain networking waveform Signal in Space (SiS) modes), two-hop reuse can result in interference when Time Divisional Multiple Access (TDMA) slots are reassigned. Within the same network, a three-hop reuse can eliminate interference yet may result in wasted resources when no two-hop interference is present.

One limitation of traditional wireless networks (such as 802.11) may include an inability to adapt to a variety of densities and users associated with the change in density.

In mobile TDMA radio systems, the I/C also limits spatial reuse of slot allocations. In particular, the design and strength of the preamble is critical as it determines whether the packet is initially acquired and how far a transmission can capture or interfere with a receiver.

In addition, the particular receiver acquisition threshold is also critical in determining the I/C. The robustness of the preamble acquisition plays a large part in the performance of a given Signal-in-Space (SiS) modulation scheme. A stronger preamble acquisition can result in a lower packet error rate at the expense of increasing the range of interference. Extra strong preamble acquisitions may be especially frequent within some Orthogonal Frequency Division Multiplexing (OFDM) SiSs, where interfering transmitters must be at least 3 hops apart to avoid self-interference. A weaker preamble acquisition can result in less interference and thus allow increased spatial reuse, thereby increasing network throughput.

However, the challenge remains to maintain a single network in possession of both qualities of lower packet error rate resulting from a strong preamble acquisition and increased spatial reuse and network throughput of the receivers with a higher preamble acquisition threshold.

SUMMARY OF THE INVENTION

To maximize distributed multi hop radio environment network capacity, it may then be desirable to leverage both cases by dynamically switching between the stronger and weaker preamble acquisitions on a transmitter-receiver link by link and slot-by-slot basis. The system and method disclosed herein may adaptively adjust the preamble acquisition threshold based on dynamic determination of interfering transmitters. In cases where I/C=2, the system may enforce two-hop reuse but use a higher preamble acquisition threshold to reduce the effect of two-hop interfering transmitters. In cases where I/C>2, the system may use a lower preamble acquisition threshold to improve sensitivity when there are no two-hop interfering transmitters.

Accordingly, an embodiment of the present invention is directed to a method for adaptive preamble control in a distributed multi-hop radio environment, comprising: determining a size of the distributed multi-hop radio environment, determining a density of the distributed multi-hop radio environment, determining an optimal point of adjustment based on an analysis of the size and the density of the distributed multi-hop radio environment, wherein the distributed multi hop radio environment has no centralized controller and the optimal point of adjustment includes at least one of: adjusting a preamble strength associated with a signal at a transmitter of the signal within the distributed multi-hop radio environment, the preamble strength adjusted to optimize a performance of the signal, and adjusting a preamble acquisition of a receiver within the distributed multi-hop radio environment, the preamble acquisition adjusted to optimize a reuse of a spatial resource available to the distributed multi-hop radio environment, the preamble acquisition adjusted based on a probability of acquisition of the signal at a specific range.

A further embodiment of the present invention includes a computer readable medium having non-transitory computer readable program code embodied therein for adaptive preamble control in a distributed multi-hop radio environment, the computer readable program code comprising instructions which, when executed by a computer device or processor, perform and direct the steps of: determining a size of the distributed multi-hop radio environment, determining a density of the distributed multi-hop radio environment, determining an optimal point of adjustment based on an analysis of the size and the density of the distributed multi-hop radio environment, wherein the distributed multi hop radio environment has no centralized controller and the optimal point of adjustment includes at least one of: adjusting a preamble strength associated with a signal at the a transmitter of the signal within the distributed multi-hop radio environment, the preamble strength adjusted to optimize a performance of the signal, and adjusting a preamble acquisition of the a receiver within the distributed multi-hop radio environment, the preamble acquisition adjusted to optimize a reuse of a spatial resource available to the distributed multi-hop radio environment, the preamble acquisition adjusted based on a probability of acquisition of the signal at a specific range.

Additional embodiments of the present invention may include a distributed multi-hop radio environment which is a Mobile Ad hoc Network (MANET), the size of the distributed multi-hop radio environment may include one of: a range from a first node to a last node, a range from the transmitter to a specific receiver, an Interference to Communication Range Ratio (I/C), and an average range between all nodes.

Additional embodiments of the present invention may include a density of the distributed multi-hop radio environment comprising one of: a number of nodes within the distributed multi-hop radio environment, a number of nodes within a specific geographical area, a number of nodes in proximity to the transmitter, a number of nodes in proximity to the receiver, a number of nodes in proximity to a transmitter's receivers, a topology of nodes, an analysis of terrain within the distributed multi-hop radio environment, an obstruction to radio frequency energy and a total number of nodes within an interference range.

Additional embodiments of the present invention may include a distributed multi-hop radio environment where the optimal point of adjustment is an identical point of adjustment used by all nodes in the distributed multi-hop radio environment and the optimal point of adjustment is an identical point of adjustment used by the transmitter for all transmissions independent of an intended receiver.

Additional embodiments of the present invention may include a distributed multi-hop radio environment where the optimal point of adjustment may further comprise: alternative points of adjustment used by the transmitter dependent upon intended receivers, alternative points of adjustment used by the transmitter dependent upon intended receivers and desired transmission Quality of Service (QoS), and alternative points of adjustment used by either or both of the transmitter and the receiver, the alternative points of adjustment dependent upon a time slot and an expected transmitter.

Additional embodiments of the present invention may include a distributed multi-hop radio environment where the optimal point of adjustment includes an identical point of adjustment used by the receiver for all transmissions to the receiver independent of the transmitter, and the receiver preamble acquisition is adjusted for optimal reception of the signal. Additionally, the optimal point of adjustment may include the transmitter, where the transmitter preamble is adjusted for optimal range of the signal.

Additional embodiments of the present invention may include a distributed multi-hop radio environment where the optimal point of adjustment is an adjustment in signal modulation and pattern, an adjustment based on a reduction in I/C, performance of a link and an adjustment on a per-transmission basis based on anticipated assigned time slots. Additional adjustments may include an adjustment on a per-transmission basis using a Clear to Send (CTS) exchange and a Request to Send (RTS) exchange.

Additional embodiments of the present invention may include a distributed multi-hop radio environment where the probability of acquisition of the signal at a specific range is adjusted by adapting at each receiver within the distributed multi-hop radio environment. Also, the preamble adjustment may be combined with an additional transmitter adjustment including one of: a transmit power, a transmit modulation, a transmit spread spectrum coding and an antenna pattern. Similarly, the preamble adaptation at the receiver may be combined with an additional alteration of a receiver antenna pattern.

Additional embodiments of the present invention may include a distributed multi-hop radio environment where the optimal point of adjustment is an additional radio system adaptation method including an adaptive frequency assignment, an adaptive time slot assignment and an adaptive spread spectrum assignment It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 5A-5C are time based graphs representative of a communication network using a three-hop constraint indicating: 5A) queue depth in ms, 5B) a number of assigned Rotating Broadcast Slots (RBS), and 5C) RBS Latency in ms representative of an embodiment of the present invention;

FIG. 6A-6C are time based graphs representative of a communication network using a two-hop constraint indicating: 6A) queue depth in ms, 6B) a number of assigned Rotating Broadcast Slots (RBS), and 6C) RBS Latency in ms representative of an embodiment of the present invention;

FIGS. 7A and 7B are diagrams of two dimensional spatial reuse improvement for dense regular topology for a communication interference ratio of three (7A) and two (7B) representative of an embodiment of the present invention;

DETAILED DESCRIPTION OF THE INVENTION

Figure 1A:
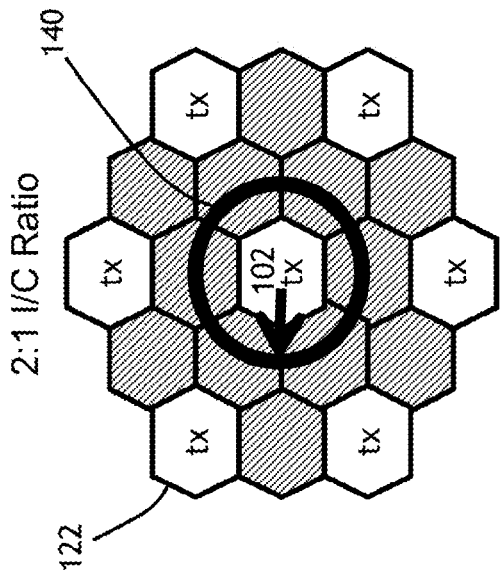
FIGS. 1A and 1B are a diagram of spatial reuse vs. interference to communication (I/C) range ratio exemplary of an embodiment of the present invention.

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention adapt the preamble strength and thus preamble acquisition threshold of signals within a distributed multi-hop radio environment network to optimize spatial reuse, range reliability, throughput, and delay. One goal may include maintaining a tradeoff between range, spatial reuse, number of users and reliability. Preferably, embodiments use two different preamble acquisition thresholds: a first threshold when little interference is expected and a second threshold when three-hop interference is detected. Thus, methods disclosed herein attempt to maximize both the probability of reception and spatial reuse.

One embodiment can adapt the preamble at the transmitter by changing the preamble coding. This transmitter-based approach offers better optimization but requires more receiver activity since each receiver must a priori know how to properly decode the preamble and follow on payload.

Another embodiment of the present invention uses Adaptive Preamble Acquisition Control (APAC). Since APAC adapts the preamble threshold at the receiver, there is no requirement for a priori coordination between the transmitter and receiver. Each receiver is operated independently of the transmitter settings thus enabling each receiver controller to properly decode the preamble and optimally receive data packets.

Simplification of control logic may be an additional goal of the present invention. Increased simplicity may be directly proportional to increased reliability. In a network wide approach, each transmission is configured for optimal performance by adaptively adjusting the preamble for desired performance. For example, a per-transmission approach may include a strong preamble intended for greater reliability within a sparsely populated distributed multi-hop radio environment. Conversely, a weak preamble and reduction in I/C ratio may allow for increased spatial reuse in a more densely populated distributed multi-hop radio environment while requiring additional relay transmissions between nodes.

This network wide approach offers the desired simple control loop resulting in stability of communication and simplicity of design. One sacrifice of the network wide approach may include limitations on control coordination among the receivers. Additional embodiments of the present invention may offer increased performance without receiver coordination.

One example of a distributed multi-hop radio environment may include a Mobile ad hoc Network (MANET). As used herein, when the term MANET is used in reference to a network of radios, the subject matter of the reference also includes reference to a distributed multi-hop radio environment.

The adjustable preamble qualities combined with APAC may offer MANET users and administrators the desired flexibility to manage the networks. For example, within a small diameter MANET, a strong preamble offers increased range and increased reliability of the receiver receiving and decoding the payload. Conversely, in a wide diameter MANET (e.g., greater than three hops), a weaker preamble combined with a lower preamble threshold sensitivity may offer the desired spatial reuse for limited spectrum availability.

As a general rule, the stronger the preamble the more reliable the transmission and/or the greater the range. With little concern for spatial reuse, some network providers (e.g., WiFi) may create a waveform with a very strong preamble with range of 150-200 meters while the actual useful range of the payload may only be approximately 20 meters. Preamble interference range (I) may be ten times the payload communication (C) range. This may be acceptable for one-on-one conversation in a remote area. However, this approach may not be optimum for more populous nodes.

In areas of more dense population, a strong preamble will cause greater interference with other users and eventually result in less spatial reuse. Including concern for total available spectrum, (e.g., a cellular provider) network administrators may very carefully tailor the preamble and payload for optimum spatial reuse.

In the past, other providers (Military, wireless LAN) may be more concerned with a one-hop link throughput. For example, should link integrity be the highest on the list of priorities, limiting a network to a one-hop topology may be in the interest of the network administrator.

This invention makes the best use of both scenarios by offering an adaptive waveform via 1) a strong preamble coupled with a higher receiver acquisition threshold for areas of sparse population giving networks the highest range possible with little or no spatial reuse, and 2) in areas of dense population or multi-hop connectivity, a weaker preamble coupled with lower receiver acquisition threshold for optimum spatial reuse to offer enhanced throughput.

Figure 1B:
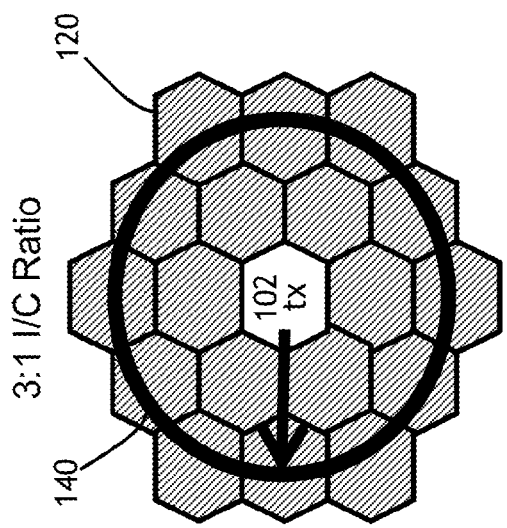

Referring generally to FIGS. 1A and 1B, a diagram of spatial reuse vs. interference to communication (I/C) range ratio exemplary of an embodiment of the present invention is shown. System 100 may configure each network for optimum performance dependent upon user desires. In FIG. 1A, a stronger preamble indicated by range circle 140 may extend to cover ranges within three hops distant from transmitting element 102. With a 3:1 I/C ratio, it takes three hops to enable a node to reuse the spectrum time slot currently used by transmitting element 102. Receiving node 120 is three hops distant from transmitting element 102; therefore receiving node 120 is too close to transmitting element 102 to allow for spatial reuse.

In FIG. 1B, a 2:1 I/C is indicated where transmitting element 102 transmits to a range of range circle 140. Outside of the 2 hop range, additional transmitting element 122 may transmit on the same frequency during the same time slot as transmitting element 102.

Analysis of each of FIG. 1A and FIG. 1B indicates how a 3:1 I/C results in a single transmitter at a time within its interference range, while a 2:1 I/C allows seven transmitters within the same area. Careful network design in optimizing I/C, burst rates, and message completion rates can thus result in increased spatial reuse and greater network throughput.

Sensitivity of the receiver ultimately determines the I/C. The APAC approach used herein allows each receiver to adjust the sensitivity to achieve a desired I/C range for a given network topology. When there is no chance of interference the acquisition processing may be optimized for 2-hop reuse. Without interference possibility, the probability of acquisition is reduced to mitigate the effect of the 3-hop interferer(s).

Embodiments of the present invention may alternate between a network wide approach and a per transmission approach based on desired strengths of each approach. With a per-transmission approach, a MANET may be strengthened for increased options for spatial reuse and increased range reliability. However a per-transmission approach may suffer from fragility to mobility and less stability than other alternatives.

As spatial reuse is one goal of the present invention, a MANET administrator may opt to sacrifice less important parameters to achieve a desired level of reuse. For example, parameters such as waveform Packet Error Rate (PER) and Signal to Noise Ratio (SNR) may be of lesser importance to the administrator. Sacrificing a ½ dB of range on a per packet reliability rate in order to increase spatial reuse may be an acceptable trade off.

In embodiments, a receiver may be enabled to adaptively adjust preamble acquisition. In order to simplify control logic within the MANET, the receivers may be periodically updated to increase or decrease threshold for preamble acquisition. Unlike a fixed cellular network where updates may be within a frequency of 600 times per second, MANET networks may be required to share update rates between all users reducing an update frequency to 4-5 times per second. This greatly reduced update rate requires simplification and stability of control logic to conform to the update rate and provide reliable communication.

The location of adjustment (transmitter or receiver) may also be dependent upon user preference and desired MANET properties. It is contemplated at least three factors may be considered when optimizing the MANET for performance within the scope of the present invention. 1) network size factor may include density of the MANET and whether the network topology is dense or sparse (e.g., in a densely populated area or in a rural setting); 2) spatial reuse requirement factors are determined by geometric placement of the nodes and spacing between nodes to allow for or deny spatial reuse; 3) desired link conditions includes communications range, preamble threshold, link reliability (e.g., a probability the receiver hears the preamble multiplied by the probability of decoding the payload), and desired necessity of communication (e.g., a specific node requiring continuous connectivity and reliability of the link to the specific user even though there may be collateral interference with other users.

Mobility may influence MANET topology and where each of the above factors resides in MANET priority. For example, a group of nodes is onboard vehicles parked in a parking lot where spatial reuse is not of concern and link reliability is primary. Here, the transmission power is highest and preamble acquisition is reduced to enable link reliability. As the vehicles may move in different directions causing the network to change to three or four hop diameter, the receivers may adapt to a higher acquisition threshold and thus allow for greater spatial reuse of the same frequency slots among various nodes.

One embodiment of the present invention may apply to one variant of a distributed resource allocation protocol such as a Unifying Slot Assignment Protocol (USAP). USAP may be defined within U.S. Pat. No. 7,382,799 entitled "On-demand broadcast protocol" issued to Young, et. al., which is incorporated by reference herein in its entirety. USAP may offer alternative variants for slot allocation based on a plurality of factors.

One embodiment of the present invention may apply to USAP in a transmission by transmission alternative. For example, each transmission may dictate a specific preamble strength as well as a receiver preamble acquisition threshold. In this manner, a per-transmission approach may offer flexibility to the transmitter to update MANET capabilities dependent on current topology.

Figure 2:
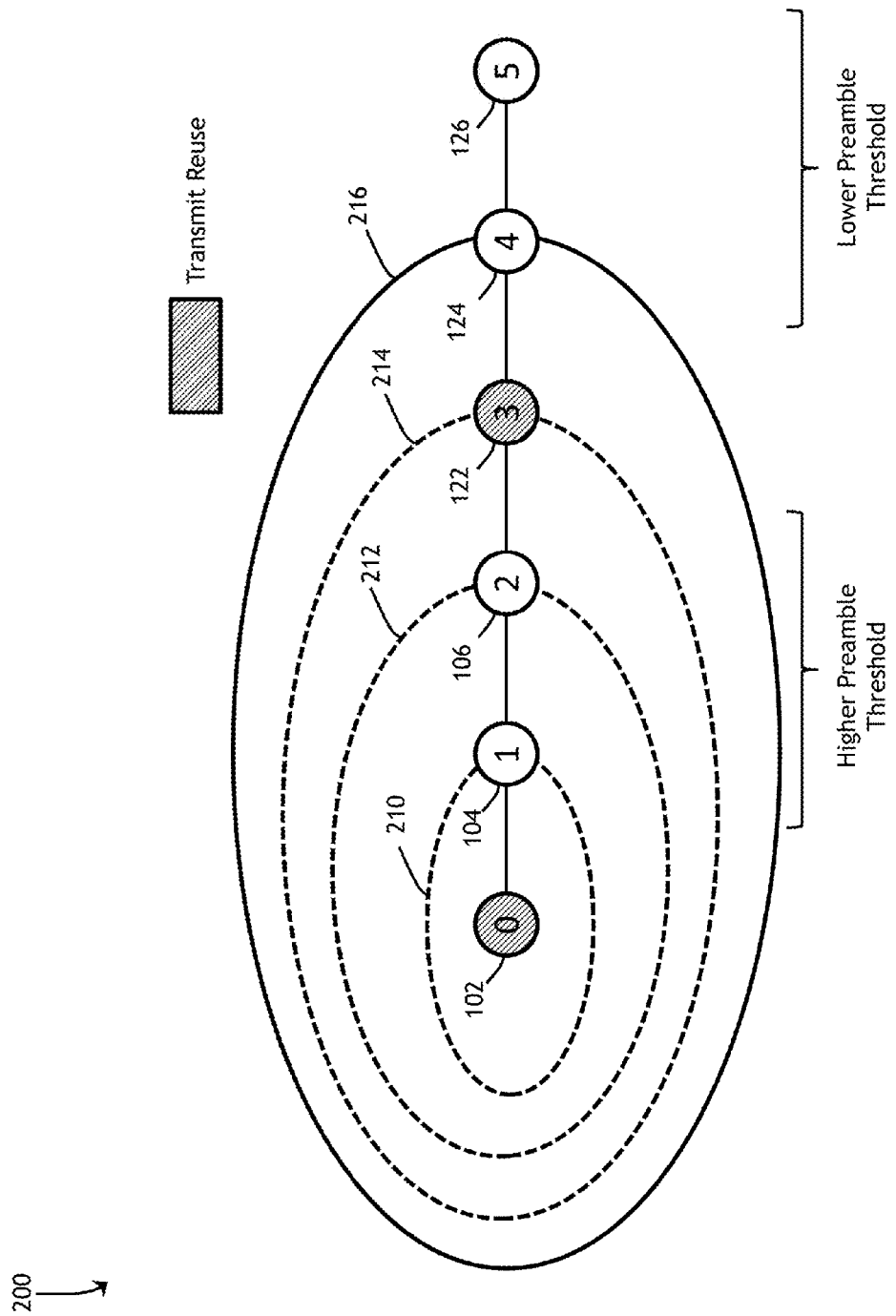
FIG. 2 is a diagram of higher and lower preamble thresholds associated with transmit reuse exemplary of an embodiment of the present invention.

Referring to FIG. 2, a diagram of higher and lower preamble thresholds associated with transmit reuse exemplary of an embodiment of the present invention is shown. Transmitting element 102 transmits on a specific channel during a specific time slot. Topology of the MANET here may include transmitting element 102, nodes 104, 106 and 122 are within communication range of transmitting element 102. Ranges 210, 212, 214 and 216 indicate node ranges relative to transmitting element 102.

As transmitting elements are more distally spaced, interference between the spaced nodes is reduced and spatial reuse becomes available. For example, transmitting element 102 is at a three hop range 214 from node 122. At this range, reuse of the identical broadcast time and frequency slot may be available for each of node 122 and transmitting element 102.

One embodiment may utilize the receiver-by-receiver and slot-by-slot control to switch between the lower and higher receiver preamble acquisition thresholds. Method 100 may choose the desired threshold depending on the presence of a transmitter within three hops that has been assigned the same slot. Specifically, method 100 uses two-hop constraints and three-hop conflict detection to optimally choose between the thresholds. One factor in the determination is that three-hop conflict detection only requires two-hop USAP information (i.e. only self-transmit (ST), self-receive (SR) and neighbor transmit (NT) information).

For example, in FIG. 2 node 122 may be assigned the same slot as transmitting element 102 since they maintain a three hop range. Transmitting element 106 and node 104 are within 3 hops of 2 transmitters using the same slot so that they must use the higher preamble threshold to sufficiently reduce the interference to capture the packet intended for each. Nodes 124 and 126 are far enough away from transmitting element 102 that they can use the lower preamble threshold to increase the probability of correctly receiving the packet. Note that node 126 does not expect to receive the packet transmitted from node 122 but it can use the lower threshold to increase the chance that it will overhear it.

Additionally, method 100 may select from additional criteria to determine a specific preamble acquisition threshold. For example, one criterion for selecting either the lower or higher threshold is whether there is more than a single transmitter within three hops of a receiver. Method 100 may detect a three hop conflict exists if a slot is a member of a first node's SR as well as the SR of a neighbor but the slot transmitter for the first node is not a neighbor of that neighbor.

Figure 3:
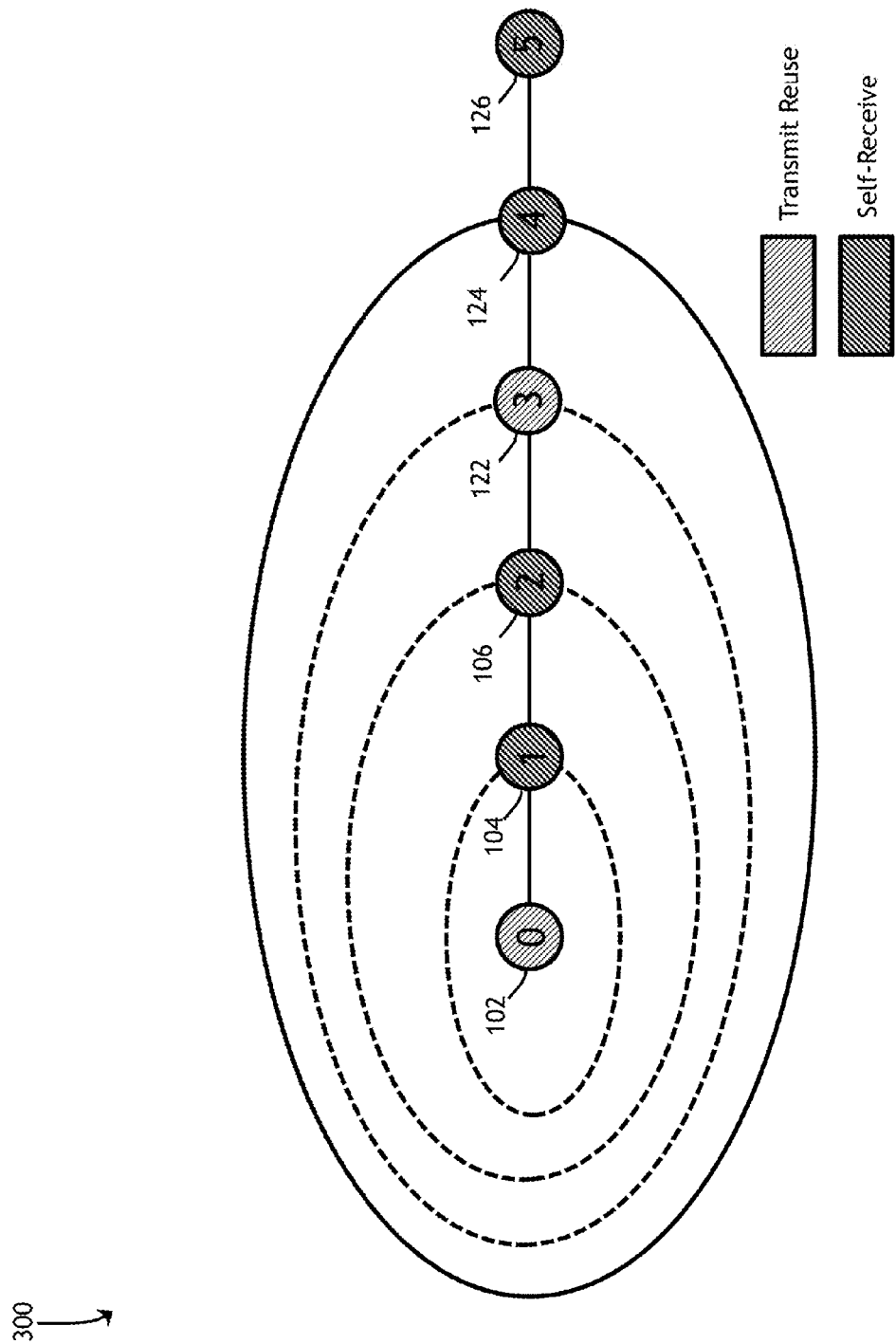
FIG. 3 is a diagram of a benefit of transmit reuse and self-receive exemplary of an embodiment of the present invention.

For example, referring to FIG. 3, a diagram of a benefit of transmit reuse and self-receive exemplary of an embodiment of the present invention is shown. If method 100 detects a three hop conflict, it may adjust preamble reception thresholds accordingly. Transmitting element 106 and node 104 may detect the three hop conflict whereas nodes 124 and 126 may not. Transmitting element 102 and node 122 may self-transmit in the same slot (transmit reuse) while transmitting element 104 and 106 (and 124 and 126) may self-receive in the same slot.

Figure 4A:
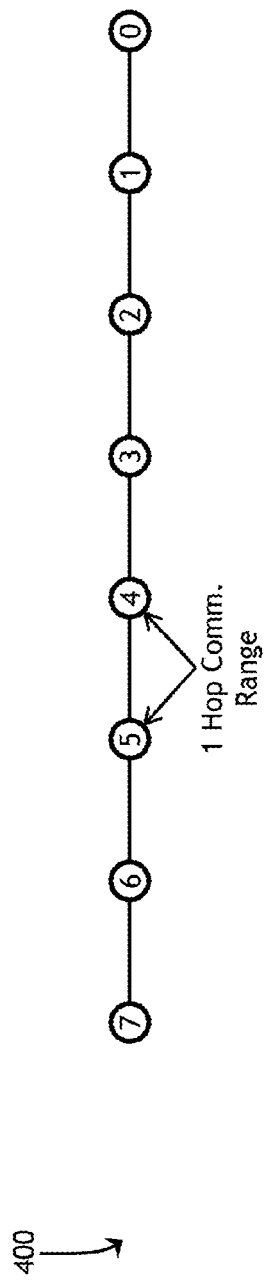
FIG. 4A is a diagram of exemplary communication nodes usable by an embodiment of the present invention.

Referring to FIG. 4A, a diagram of exemplary communication nodes usable by an embodiment of the present invention is shown. Nodes 7 through 0 indicate an exemplary MANET topology. Communication flow is in the direction of 7 to 0 through the path hops. Communication range is limited to a one hop distance while interference range may be substantially greater. With an I/C of 3:1 based on the detected MANET topology, spatial reuse may be unavailable.

Spatial reuse may be available as MANET constraints are reduced. For example, with a three hop constraint, node ranges may be insufficient to enable adequate spatial reuse. However, lowering the constraint to two may offer desired reuse of limited spectrum resources.

Figure 4B:
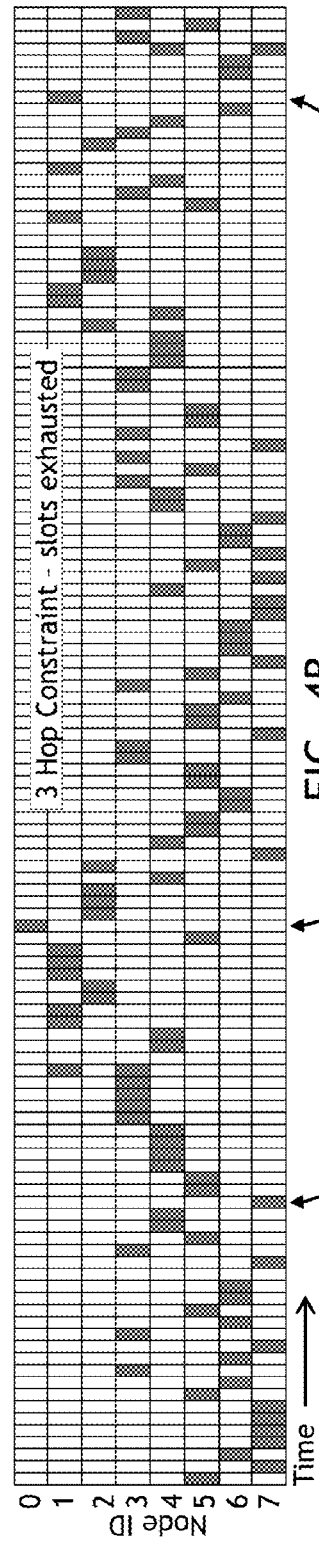
FIGS. 4B and 4C are diagrams of frequency slots usable by communication nodes acting in accordance with an embodiment of the present invention.

Referring to FIG. 4B, diagrams of frequency slots usable by communication nodes acting in accordance with an embodiment of the present invention are shown. FIG. 4B indicates a three hop constraint offering no spatial reuse to nodes within the MANET. Specifically, in slot 410, node 7 uses slot 410 eliminating the reuse of slot 410 to each of the other nodes in the MANET. Slot 420 remains unused by any node preceding node 0 and slot 430 is eventually used by node 1. Here, a level of traffic flowing from node 7 to node 0 is such that all available slots become exhausted.

Figure 4C:
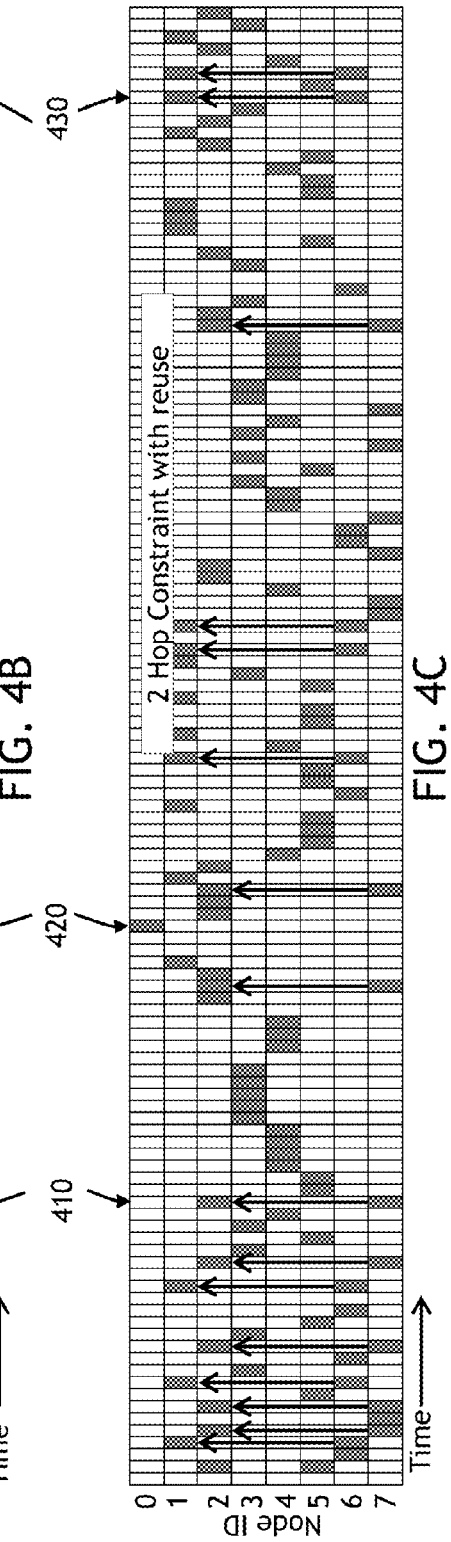

However, if the topology allows for the constraint to be reduced to a two hop constraint, spatial reuse becomes available. FIG. 4C indicates available spatial reuse after a two hop constraint is fulfilled. Slot 410 initially used by node 7 may now be reused (indicated by vertical arrows) by two hop distant node 2. Slot 430 initially used by node 6 is available and used by two hop distant node 1.

Referring to FIGS. 5A-5C, time based graphs representative of a communication network using a three-hop constraint indicating: 5A) queue depth in ms, 5B) a number of assigned Rotating Broadcast Slots (RBS), and 5C) RBS Latency in ms representative of an embodiment of the present invention are shown. FIGS. 5A and 5C indicate the effects on queuing and latency when the network is starved for slots. FIG. 5A indicates an instability in the queue sizes as the nodes contend for the few remaining slots. Queue depth fluctuates as the slots are assigned with the number of slots averaging to approximately 125. Also, the average total end-to-end queue latency is over 15 seconds.

Referring to FIGS. 6A-6C, time based graphs representative of a communication network using a two-hop constraint indicating: 6A) queue depth in ms, 6B) a number of assigned Rotating Broadcast Slots (RBS), and 6C) RBS Latency in ms representative of an embodiment of the present invention are shown. The difference between the three hop constraint and the two hop constrain becomes more apparent. Queue depth stabilizes at approximately 200 seconds while assigned slots increases to an average of 145. Latency indicates the largest change as average stabilizes at approximately 4 seconds.

Referring to FIGS. 7A and 7B, diagrams of two dimensional spatial reuse improvement for dense regular topology for a communication interference ratio of three (7A) and two (7B) representative of an embodiment of the present invention are shown. An improvement of 2.4 times may be realized by decreasing the I/C in dense regular topology from three hops to two. FIG. 7A indicates 19 possible transmissions in 7 slots (repeating) for a total of 76 transmissions in the available 28 slots. As the I/C ratio is reduced to two, FIG. 7B indicates there are now 26 transmissions available in four repeating slots for a total of 182 transmissions in the same 28 available slots (28 being the least common multiple of 7 and 4 indicating a direct comparison).

In this configuration, with I/C=3 (7A) a node may reuse a time slot after 7 cycles while in configuration I/C=2 (7B), a node may reuse a time slot after 4 cycles. Method 100 may thus realize greater throughput with I/C=2.

Figure 8A:
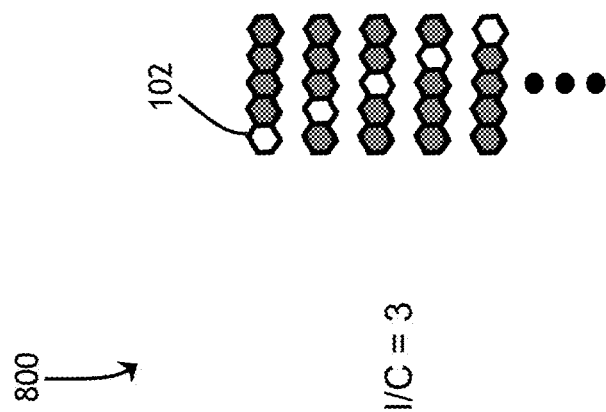
FIGS. 8A and 8B are diagrams of one dimensional spatial reuse improvement for dense regular topology for a communication interference ratio of three (8A) and two (8B) representative of an embodiment of the present invention.
Figure 8B:
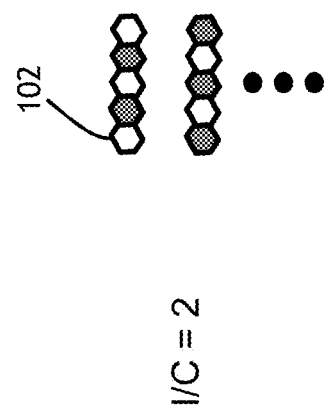

Referring to FIGS. 8A and 8B, diagrams of one dimensional spatial reuse improvement for dense regular topology for a communication interference ratio of three (8A) and two (8B) representative of an embodiment of the present invention are shown. FIG. 8A represents an I/C=3, where, in an available 10 slots, 10 transmissions are available while FIG. 8B represents the same 10 slots generate 25 transmissions with an I/C=2. Method 100 may realize this 2.5× improvement in transmissions may be realized by the reduction.

Figure 9A:
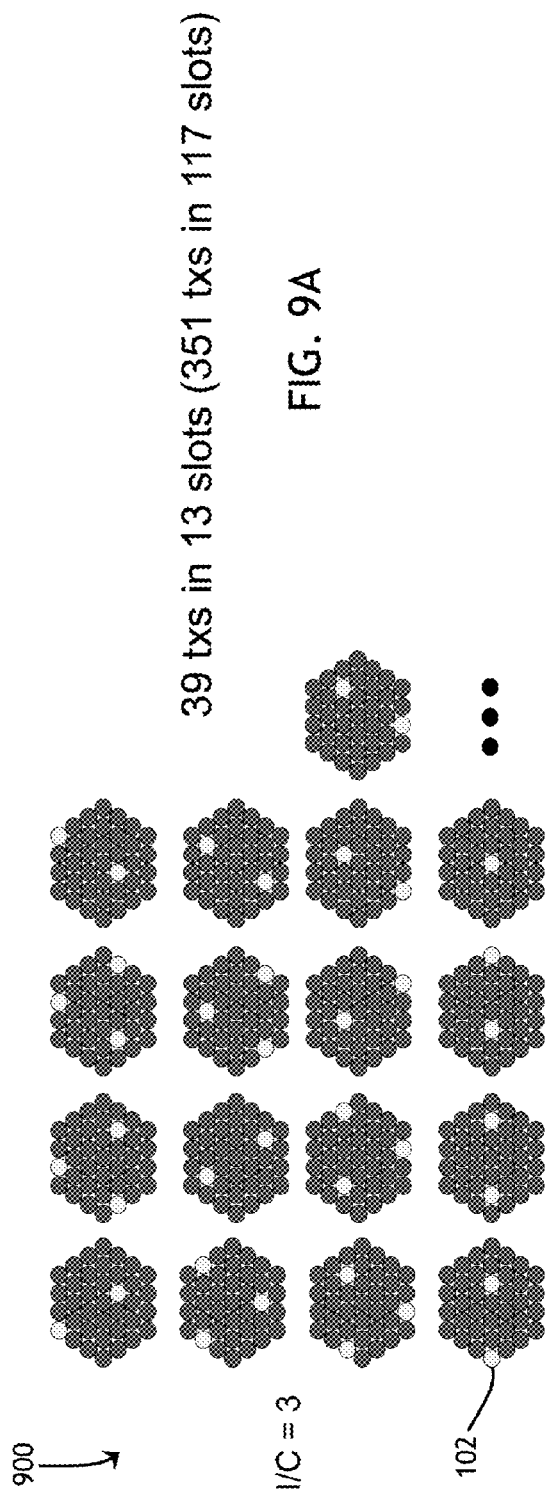
FIGS. 9A and 9B are diagrams of two dimensional spatial reuse improvement for sparse regular topology for a communication interference ratio of three (9A) and two (9B) representative of an embodiment of the present invention.
Figure 9B:
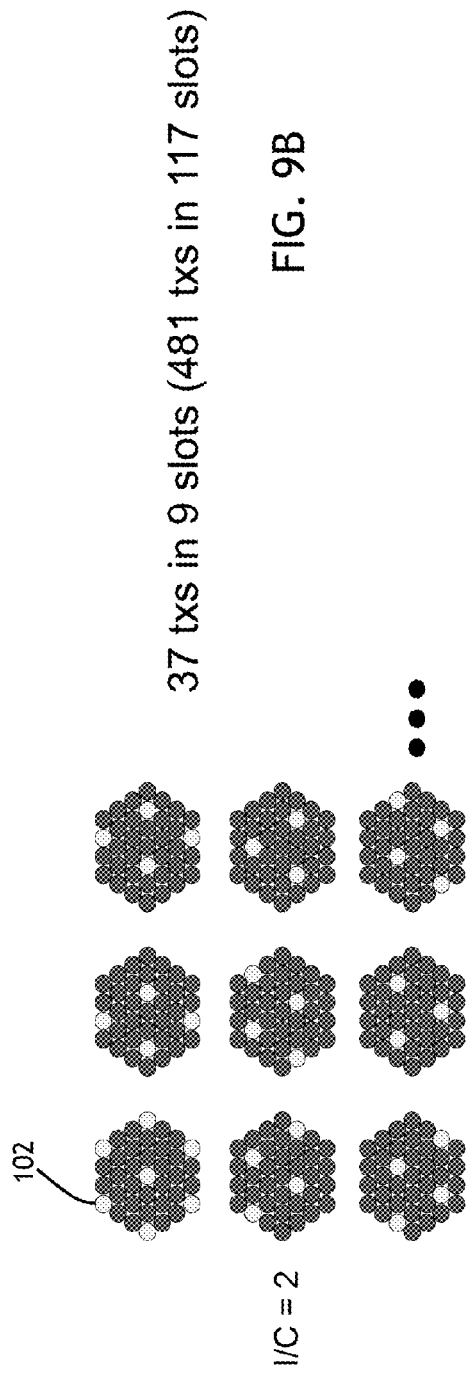

In sparse regular topology, benefits of method 100 may be realized, albeit at a lesser factor. Referring to FIGS. 9A and 9B, diagrams of two dimensional spatial reuse improvement for sparse regular topology for a communication interference ratio of three (9A) and two (9B) representative of an embodiment of the present invention are shown. With an I/C=3, 117 slots may generate 351 transmissions. If method 100 reduces the I/C=2, the same 117 slots may enable 481 transmissions; a 1.4× improvement.

Figure 10A:
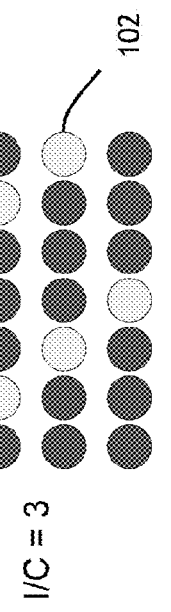
FIGS. 10A and 10B are diagrams of one dimensional spatial reuse improvement for sparse regular topology for a communication interference ratio of three (10A) and two (10B) representative of an embodiment of the present invention.
Figure 10B:
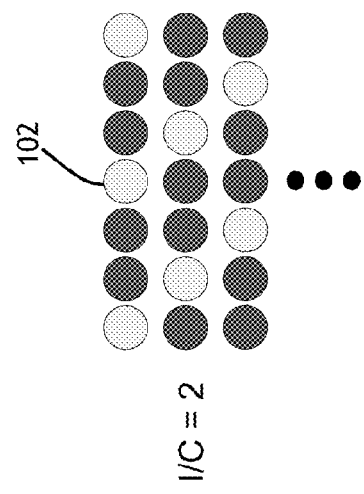

Linearly, spatial reuse in sparse regular topology may increase a lesser amount with a change in I/C. Referring to FIGS. 10A and 10B, a diagrams of one dimensional spatial reuse improvement for sparse regular topology for a communication interference ratio of three (10A) and two (10B) representative of an embodiment of the present invention is shown. Should method 100 reduce the I/C from 3 to 2, very little improvement is realized. In the 12 available slots, transmissions move from 27 available with I/C=3 and 28 transmissions are realized with I/C=2.

Figure 11:
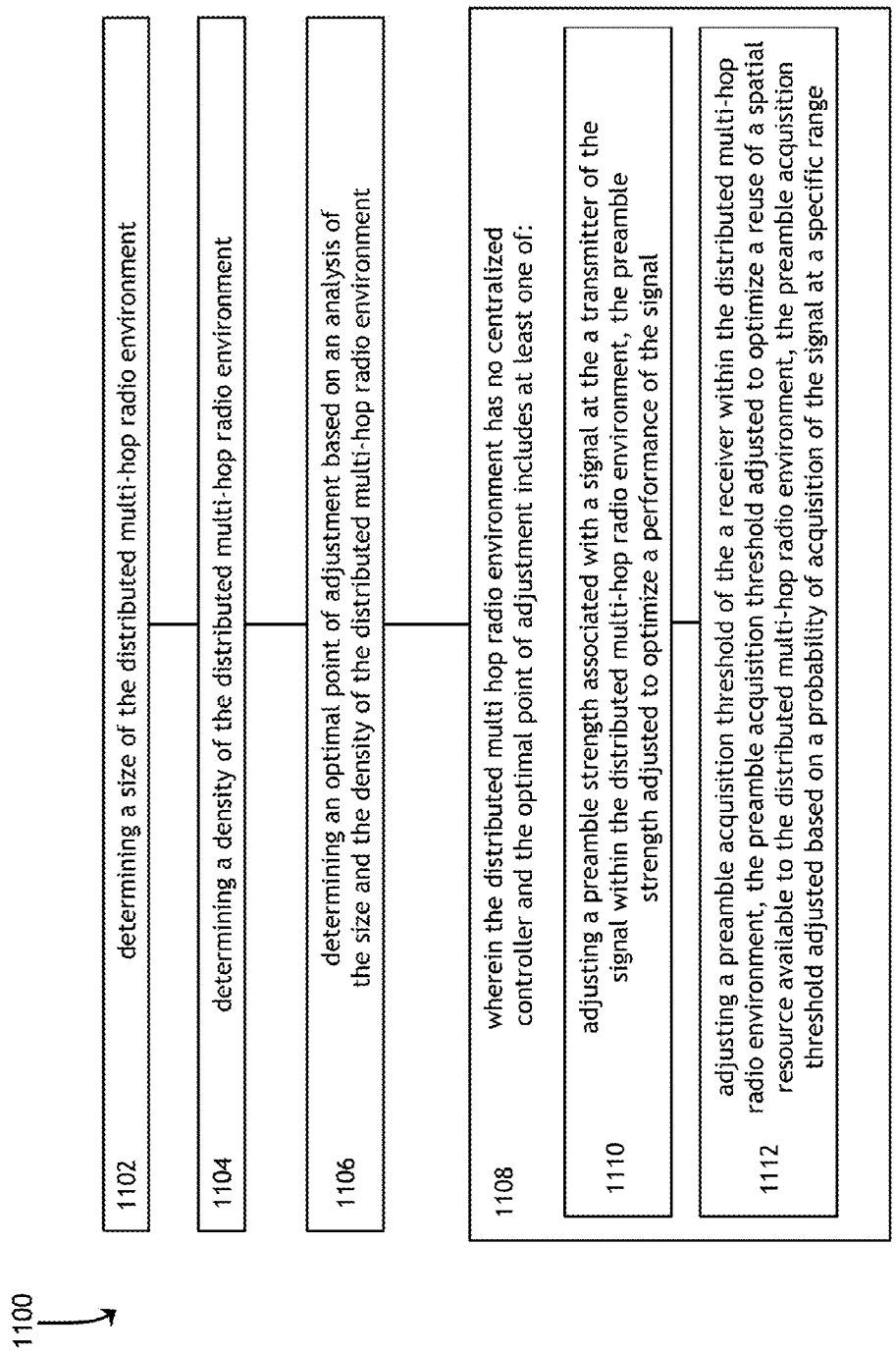
FIG. 11 is a flow diagram of a method for slot-by-slot preamble acquisition control to increase network capacity in a distributed multi-hop radio environment network representative of an embodiment of the present invention.

Referring to FIG. 11, a flow diagram of a method for slot-by-slot preamble acquisition control to increase network capacity in a distributed multi-hop radio environment network representative of an embodiment of the present invention is shown. Method 1100 begins at step 1102 with determining a size of the distributed multi-hop radio environment, and, at step 1104, determining a density of the distributed multi-hop radio environment. At step 1106, determining an optimal point of adjustment based on an analysis of the size and the density of the distributed multi-hop radio environment, and, at step 1108 wherein the distributed multi hop radio environment has no centralized controller and the optimal point of adjustment includes at least one of: at step 1110, adjusting a preamble strength associated with a signal at the a transmitter of the signal within the distributed multi-hop radio environment, the preamble strength adjusted to optimize a performance of the signal, and finally, at step 1112, adjusting a preamble acquisition threshold of the a receiver within the distributed multi-hop radio environment, the preamble acquisition threshold adjusted to optimize a reuse of a spatial resource available to the distributed multi-hop radio environment, the preamble acquisition threshold adjusted based on a probability of acquisition of the signal at a specific range.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for adaptive preamble control in a distributed multi-hop radio environment, comprising:
   determining a size of the distributed multi-hop radio environment;
   determining a density of the distributed multi-hop radio environment;
   determining an improved point of adjustment based on an analysis of the size and the density of the distributed multi-hop radio environment; and adjusting to the improved point of adjustment, wherein adjusting to the improved point of adjustment comprises:
  adjusting a preamble acquisition sensitivity of a receiver within the distributed multi-hop radio environment based at least on a probability of acquisition of a signal at a specific range and on anticipated assigned time slots on a per-transmission basis to improve a reuse of a spatial resource available to the distributed multi-hop radio environment.

2. The method for adaptive preamble control of claim 1, wherein the distributed multi-hop radio environment is a Mobile Ad hoc Network (MANET).

3. The method for adaptive preamble control of claim 1, wherein the size of the distributed multi-hop radio environment further comprises at least one of: a range from a first node to a last node, a range from a transmitter to a specific receiver, an Interference to Communication Range Ratio (I/C), and an average range between all nodes.

4. The method for adaptive preamble control of claim 1, wherein the density of the distributed multi-hop radio environment further comprises at least one of: a number of nodes within the distributed multi-hop radio environment, a number of nodes within a specific geographical area, a number of nodes in proximity to a transmitter, a number of nodes in proximity to the receiver, a number of nodes in proximity to a transmitter's receivers, a topology of nodes, an analysis of terrain within the distributed multi-hop radio environment, an obstruction to radio frequency energy, and a total number of nodes within an interference range.

5. The method for adaptive preamble control of claim 1, wherein the improved point of adjustment is an identical point of adjustment used by all nodes in the distributed multi-hop radio environment.

6. The method for adaptive preamble control of claim 1, wherein the improved point of adjustment is an identical point of adjustment used by a transmitter for all transmissions independent of an intended receiver.

7. The method for adaptive preamble control of claim 1, wherein the improved point of adjustment further comprises alternative points of adjustment used by at least one of a transmitter and the receiver, the alternative points of adjustment dependent upon at least one of a time slot and an expected transmitter.

8. The method for adaptive preamble control of claim 1, wherein the improved point of adjustment is of the receiver, the preamble acquisition sensitivity of the receiver adjusted for improved reception of the signal.

9. The method for adaptive preamble control of claim 1, wherein adjusting the preamble acquisition of the receiver within the distributed multi-hop radio environment is further based on a reduction in Interference to Communication Range Ratio (I/C) or a performance of a link.

10. The method for adaptive preamble control of claim 1, wherein adjusting the preamble acquisition of the receiver within the distributed multi-hop radio environment further comprises adjustment on a per-transmission basis using at least one of: a Clear to Send (CTS) exchange and an Request to Send (RTS) exchange.

11. The method for adaptive preamble control of claim 1, wherein the probability of acquisition of the signal at a specific range is adjusted by adapting at each receiver within the distributed multi-hop radio environment.

12. The method for adaptive preamble control of claim 1, wherein the improved point of adjustment further includes adapting the preamble at the receiver combined with an alteration of a receiver antenna pattern.

13. The method for adaptive preamble control of claim 1, wherein the improved point of adjustment further includes an additional radio system adaptation method including at least one of: an adaptive frequency assignment, an adaptive time slot assignment, and an adaptive spread spectrum assignment.

14. The method of claim 1, wherein the improved point of adjustment is an optimal point of adjustment.

15. The method of claim 14, wherein adjusting to the optimal point of adjustment further comprises:
  adjusting a preamble strength associated with the signal at a transmitter of the signal within the distributed multi-hop radio environment to optimize a performance of the signal.

16. The method of claim 15, wherein the distributed multi hop radio environment has no centralized controller.

17. The method of claim 1, wherein adjusting to the improved point of adjustment further comprises:
  adjusting a preamble strength associated with the signal at a transmitter of the signal within the distributed multi-hop radio environment to improve a performance of the signal.

18. The method for adaptive preamble control of claim 17, wherein the improved point of adjustment further comprises alternative points of adjustment used by the transmitter dependent upon intended receivers.

19. The method for adaptive preamble control of claim 17, wherein the improved point of adjustment further comprises alternative points of adjustment used by the transmitter dependent upon intended receivers and desired transmission Quality of Service (QoS).

20. The method for adaptive preamble control of claim 17, wherein the improved point of adjustment further comprises an identical point of adjustment used by the receiver for all transmissions to the receiver independent of the transmitter.

21. The method for adaptive preamble control of claim 17, wherein adjusting the preamble strength associated with the signal at the transmitter of the signal within the distributed multi-hop radio environment to improve the performance of the signal further comprises:
  adjusting a modulation or a pattern.

22. The method for adaptive preamble control of claim 17, wherein the improved point of adjustment further comprises: a preamble adjustment at the transmitter combined with an additional transmitter adjustment including at least one of: a transmit power, a transmit modulation, a transmit spread spectrum coding, and an antenna pattern.

23. A computer readable medium having non-transitory computer readable program code embodied therein for adaptive preamble control in a distributed multi-hop radio environment, the computer readable program code comprising instructions which, when executed by a computer device or processor, perform and direct steps of:
  determining a size of the distributed multi-hop radio environment;
  determining a density of the distributed multi-hop radio environment;
  determining an improved point of adjustment based on an analysis of the size and the density of the distributed multi-hop radio environment; and
  adjusting to the improved point of adjustment, wherein adjusting to the improved point of adjustment comprises:
    adjusting a preamble acquisition sensitivity of a receiver within the distributed multi-hop radio environment based at least on a probability of acquisition of a signal at a specific range and on anticipated assigned time slots on a per-transmission basis to improve a reuse of a spatial resource available to the distributed multi-hop radio environment.

24. The computer readable medium of claim 23, wherein the distributed multi-hop radio environment is a Mobile Ad hoc Network (MANET).

25. The computer readable medium of claim 23, wherein the size of the distributed multi-hop radio environment further comprises at least one of: a range from a first node to a last node, a range from a transmitter to a specific receiver, an Interference to Communication Range Ratio (I/C), and an average range between all nodes.

26. The computer readable medium of claim 23, wherein the density of the distributed multi-hop radio environment further comprises at least one of: a number of nodes within the distributed multi-hop radio environment, a number of nodes within a specific geographical area, a number of nodes in proximity to a transmitter, a number of nodes in proximity to the receiver, a number of nodes in proximity to a transmitter's receivers, a topology of nodes, an analysis of terrain within the distributed multi-hop radio environment, an obstruction to radio frequency energy and a total number of nodes within an interference range.

27. The computer readable medium of claim 23, wherein the improved point of adjustment is an identical point of adjustment used by all nodes in the distributed multi-hop radio environment.

28. The computer readable medium of claim 23, wherein the improved point of adjustment is an identical point of adjustment used by a transmitter for all transmissions independent of an intended receiver.

29. The computer readable medium of claim 23, wherein the improved point of adjustment further comprises alternative points of adjustment used by at least one of a transmitter and the receiver, the alternative points of adjustment dependent upon at least one of a time slot and an expected transmitter.

30. The computer readable medium of claim 23, wherein the improved point of adjustment is of the receiver, the receiver preamble acquisition adjusted for optimal reception of the signal.

31. The computer readable medium of claim 23, wherein adjusting the preamble acquisition of the receiver within the distributed multi-hop radio environment is further based on a reduction in Interference to Communication Range Ratio (I/C) or a performance of a link.

32. The computer readable medium of claim 23, wherein adjusting the preamble acquisition of the receiver within the distributed multi-hop radio environment further comprises adjustment on a per-transmission basis using at least one of: a Clear to Send (CTS) exchange and an Request to Send (RTS) exchange.

33. The computer readable medium of claim 23, wherein the probability of acquisition of the signal at a specific range is adjusted by adapting at each receiver within the distributed multi-hop radio environment.

34. The computer readable medium of claim 23, wherein the improved point of adjustment further includes adapting the preamble at the receiver combined with an alteration of a receiver antenna pattern.

35. The computer readable medium of claim 23, wherein the improved point of adjustment further includes an additional radio system adaptation method including at least one of: an adaptive frequency assignment, an adaptive time slot assignment, and an adaptive spread spectrum assignment.

36. The computer readable medium of claim 23, wherein adjusting to the improved point of adjustment further comprises:
adjusting a preamble strength associated with the signal at a transmitter of the signal within the distributed multi-hop radio environment to improve a performance of the signal.

37. The computer readable medium of claim 36, wherein the improved point of adjustment further comprises: alternative points of adjustment used by the transmitter dependent upon intended receivers.

38. The computer readable medium of claim 36, wherein the improved point of adjustment is of the transmitter, the transmitter preamble adjusted for improved range of the signal.

39. The computer readable medium of claim 36, wherein adjusting the preamble strength associated with the signal at the transmitter of the signal within the distributed multi-hop radio environment to improve the performance of the signal further comprises:
adjusting a modulation or a pattern.

40. The computer readable medium of claim 36, wherein the improved point of adjustment further comprises: a preamble adjustment at the transmitter combined with an additional transmitter adjustment including at least one of: a transmit power, a transmit modulation, a transmit spread spectrum coding, and an antenna pattern.

* * * * *